United States Patent [19]

Harben, Jr.

[11] 4,118,829
[45] Oct. 10, 1978

[54] OPENING CUT MACHINE

[75] Inventor: Grover S. Harben, Jr., Gainesville, Ga.

[73] Assignee: Stork-Gamco, Inc., Gainesville, Ga.

[21] Appl. No.: 763,669

[22] Filed: Jan. 28, 1977

Related U.S. Application Data

[63] Continuation of Ser. No. 638,961, Dec. 8, 1975, abandoned, which is a continuation-in-part of Ser. No. 459,476, Apr. 10, 1974, abandoned.

[51] Int. Cl.$^2$ ............................................. A22C 21/00
[52] U.S. Cl. ........................................... 17/11; 17/45
[58] Field of Search ......................... 17/11, 52, 23, 45

[56] References Cited

U.S. PATENT DOCUMENTS

| | | | |
|---|---|---|---|
| 3,417,424 | 12/1968 | Chamberlain | 17/11 |
| 3,480,991 | 12/1969 | Edwards, Sr. | 17/11 |
| 3,490,092 | 1/1970 | Harrison | 17/11 |
| 3,714,682 | 2/1971 | Harben, Jr. | 17/11 |
| 3,724,032 | 4/1973 | Harben, Jr. | 17/11 |
| 3,744,087 | 6/1973 | Vertegaal | 17/11 |
| 3,765,055 | 10/1973 | Lewis | 17/11 |
| 3,805,328 | 4/1974 | Strandinis et al. | 17/11 |
| 3,806,988 | 4/1974 | Harben, Jr. | 17/11 |

*Primary Examiner*—Louis G. Mancene
*Assistant Examiner*—Paul J. Hirsch
*Attorney, Agent, or Firm*—Newton, Hopkins & Ormsby

[57] ABSTRACT

A poultry cutting machine for opening poultry suspended from shackles being conveyed along a process line for evisceration at a predetermined velocity. The machine comprises a pair of advancing rollers disposed adjacent one another; a cutting blade mounted adjacent the pair of advancing rollers; shackle positioners mounted for movement above the pair of advancing rollers in contact with the shackles for guiding poultry into engagement with the advancing rollers; and a drive for driving the advancing rollers in mutually opposite rotational directions and the shackle positioners above the counter rotating advancing rollers.

5 Claims, 10 Drawing Figures

OPENING CUT MACHINE

REFERENCE TO RELATED APPLICATION

This is a continuation of application Ser. No. 638,961 filed on Dec. 8, 1975, now abandoned which is a continuation in part of Ser. No. 459,476 filed Apr. 10, 1974, now abandoned.

BACKGROUND OF THE INVENTION

This invention relates to machines for cutting open poultry for evisceration.

Recently, poultry processing plants have become automated to a large extent. For example, machines such as that disclosed in U.S. Pat. No. 3,702,017 are now used to stun the birds for processing. Killing itself may be performed by apparatus such as that disclosed in U.S. Pat. No. 3,724,029. After killing, the bird feathers may be picked by the machinery exemplified in U.S. Pat. No. 3,747,159. The oil glands may be removed by the use of a machine such as that shown in U.S. Pat. No. 3,714,682, and the vent removed by apparatus like that shown in U.S. Pat. No. 3,705,440.

Though the just mentioned poultry processing steps have been successfully automated one process step has heretofore eluded successful automation and thus continued to be done manually in actual practice. Specifically, machinery has not been devised to adequately perform the opening cut upon the fowls to enable the viscera to be extracted. This lack of success has been attributable principally to the location where opening incisions are preferably made, namely just beneath in the tail. The birds are normally processed in an inverted position with their hocks suspended by shackles pivotally mounted to an overhead conveyor line. This orientation places the tail region roughly midway down the bird body while the pivotal mounting enables the birds to be manipulated along the process line. This orientation, location, and suspension has rendered it quite difficult to devise machinery which may positively grip and direct the tail regions of the birds over cutting apparatus since engagement by machinery structural elements typically creates a moment which causes the bird to rebound away from the apparatus laterally to one side of the conveyor line. Furthermore, even where gripping is achieved such often places a drag on the birds causing their lower regions to pivot rearwardly into interference with the next successive bird.

Accordingly, it is a general object of the present invention to provide opening cut machines for opening poultry for evisceration.

Another object of the invention is to provide machines for automatically making opening cuts in the tail region of poultry pivotally suspended from shackles moving in a conveyor line.

SUMMARY OF THE INVENTION

In one form of the invention a poultry cutting machine is provided for opening poultry suspended from shackles being conveyed along a process line for evisceration at a predetermined velocity. The machine comprises a pair of advancing rollers disposed adjacent one another and a cutting blade mounted adjacent the pair of advancing rollers. Shackle positioning means are mounted for movement above said pair of advancing rollers in contact with the shackles for guiding poultry into engagement with the advancing rollers. Drive means are also provided for driving the advancing rollers in mutually opposite rotational directions and the shackle positioning means above the counter rotating advancing rollers.

DETAILED DESCRIPTION OF THE DRAWING

Figure 1:
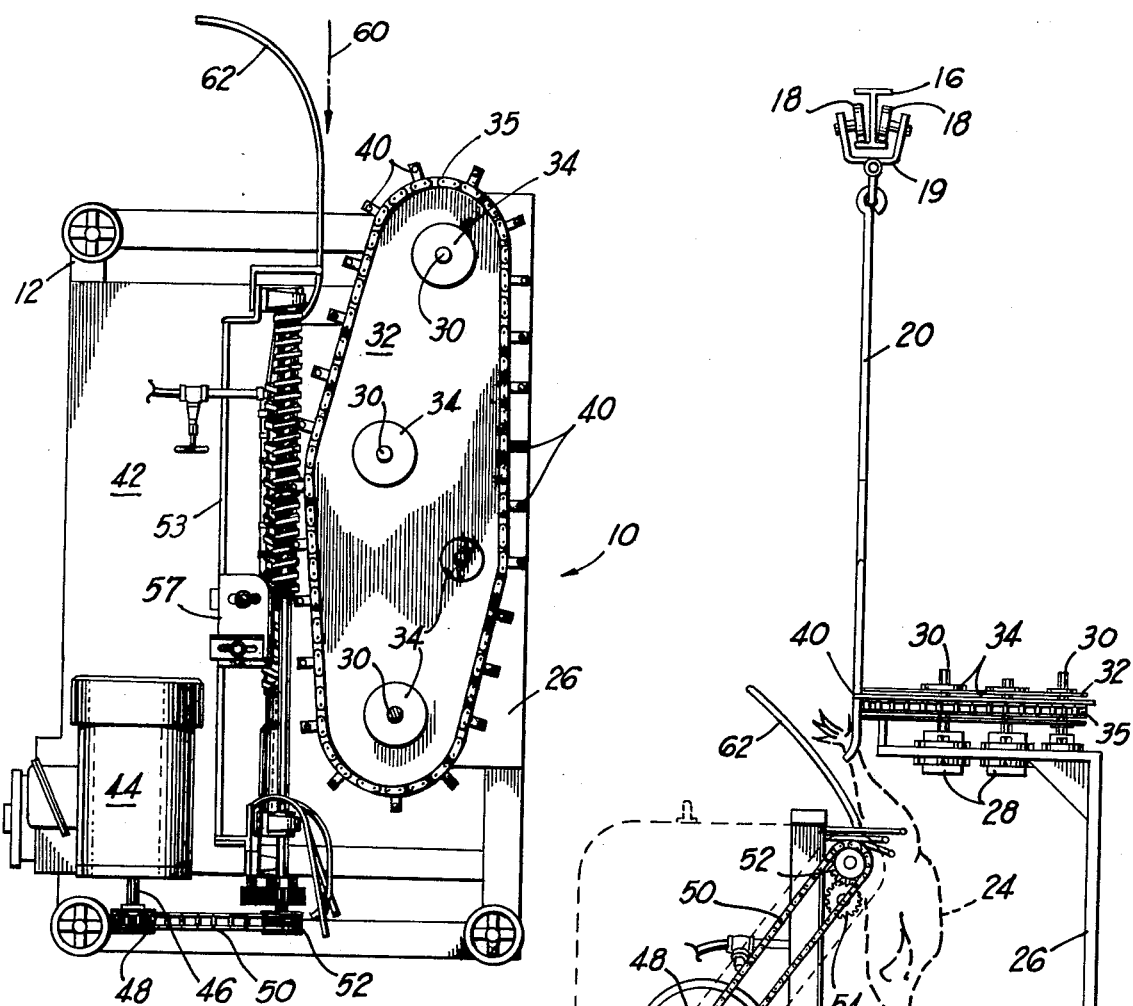
FIG. 1 is a plan view of an opening cut machine embodying principles of the invention in one form.
Figure 2:
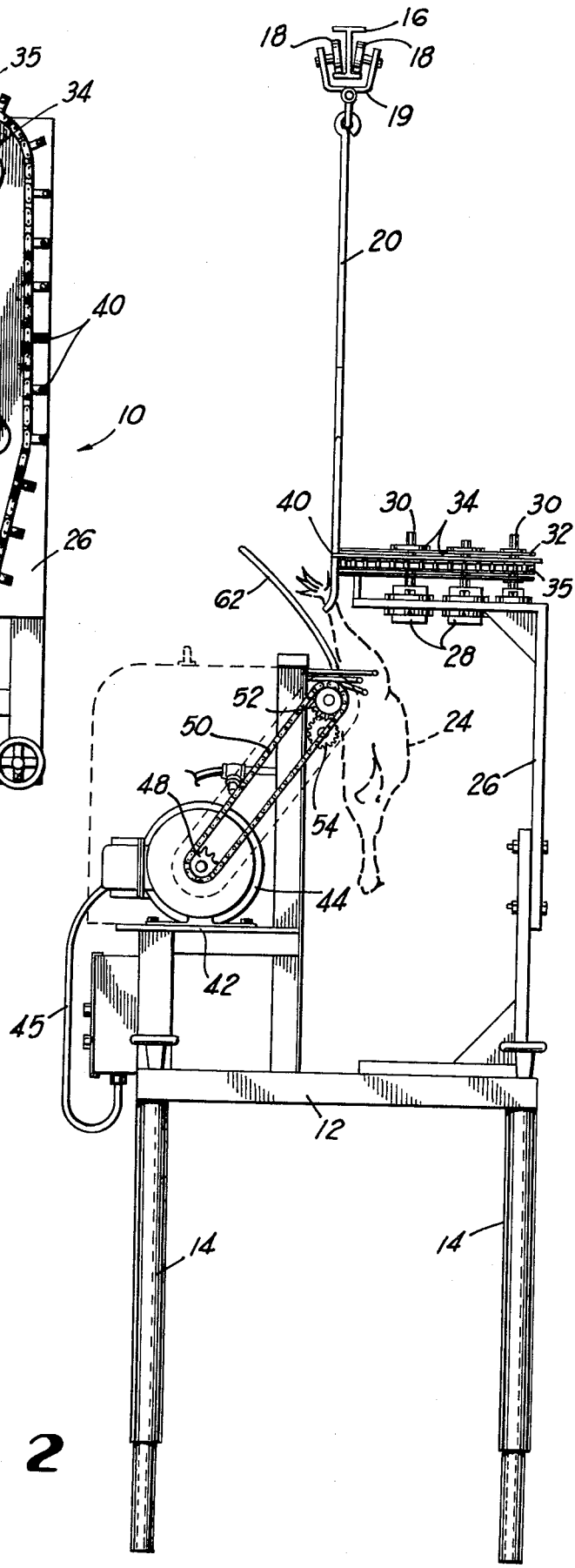
FIG. 2 is an end view of the machine shown in FIG. 1.
Figure 3:
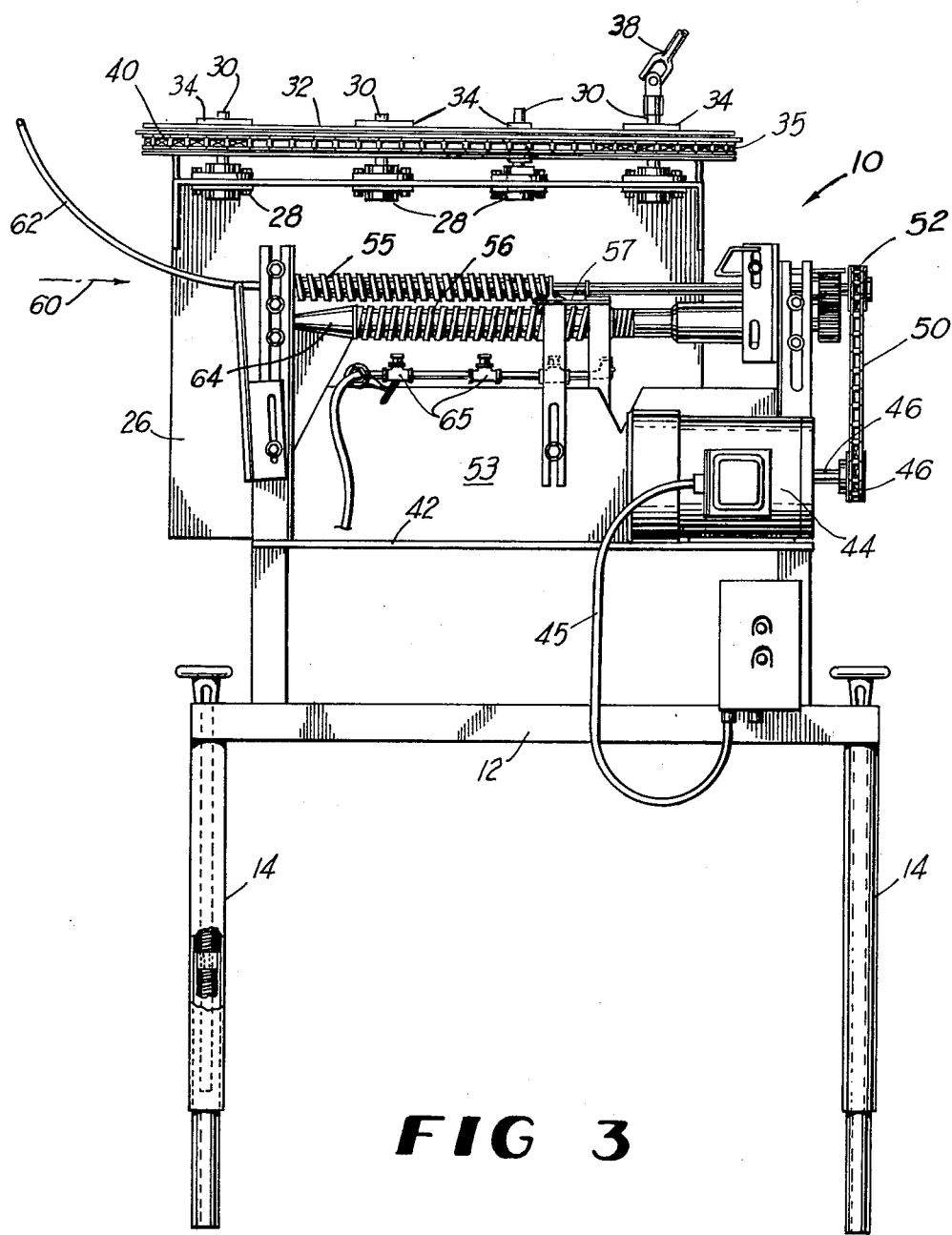
FIG. 3 is a side view in elevation of the machine shown in FIGS. 1 and 2.
Figure 4:
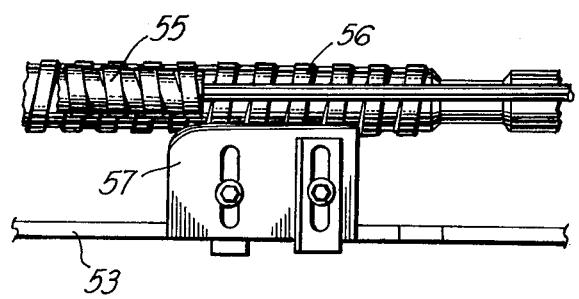
FIG. 4 is a fragmentary view of a portion of the machine shown in the other figures.
Figure 5:
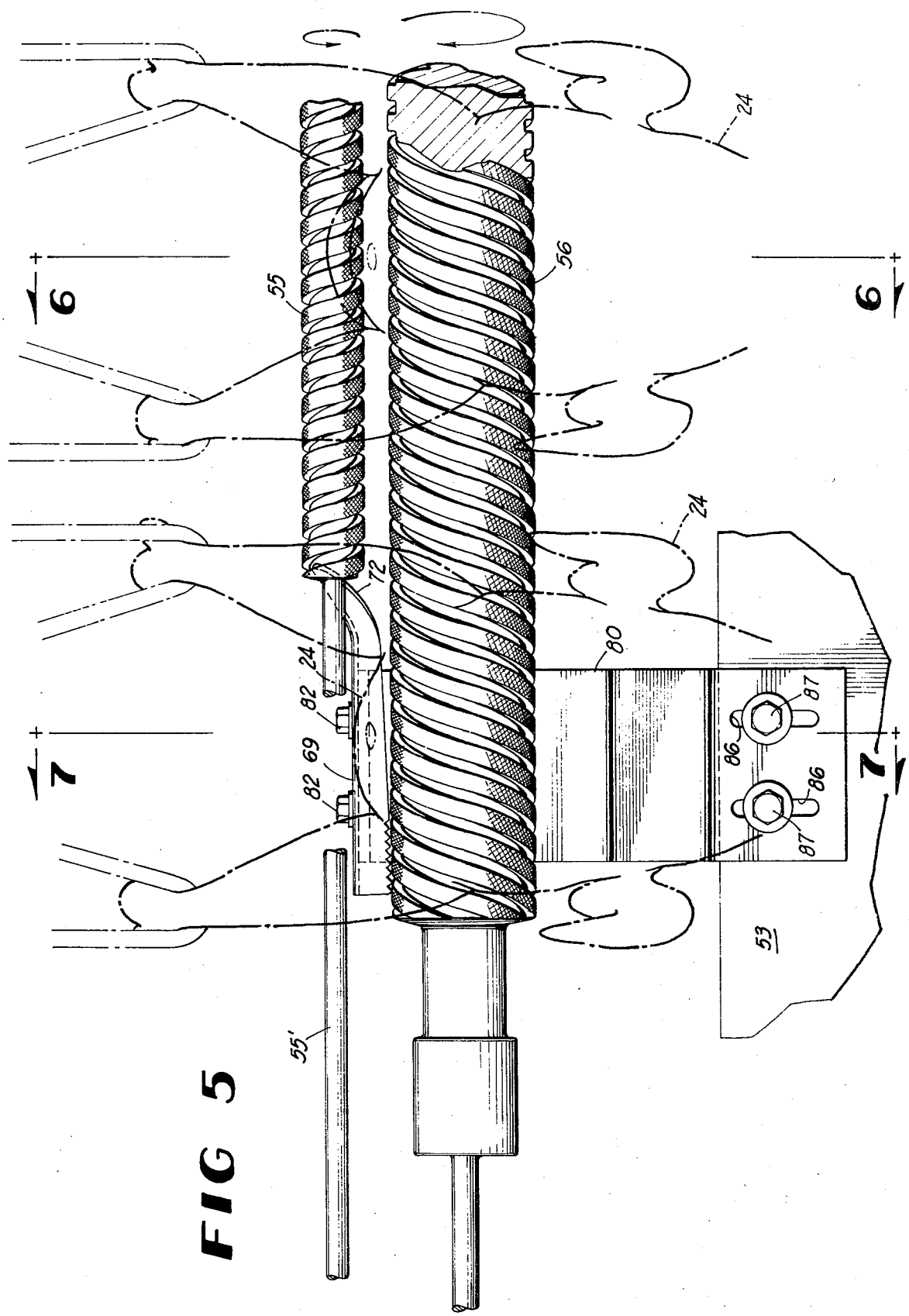
FIG. 5 is a side elevational view of the fragment of FIG. 4 shown in an alternative form.
Figure 6:
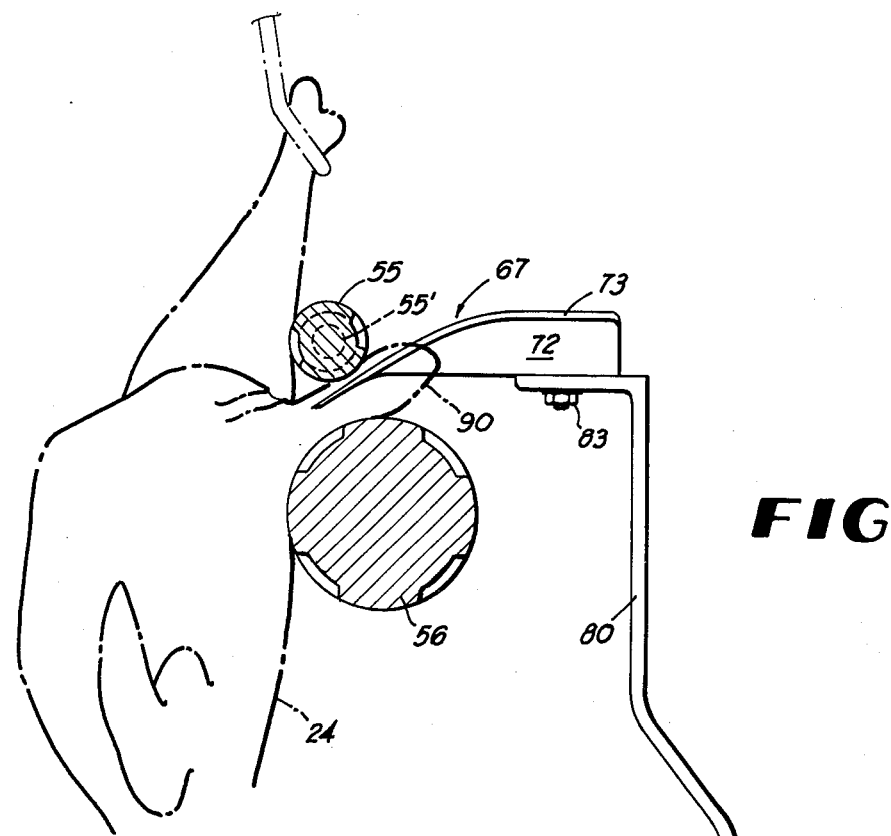
FIGS. 6 and 7 are cross-sectional views of the fragment shown in FIG. 5 taken along planes 6—6 and 7—7, respectively.

Referring now in more detail to the drawing there is shown an opening cut machine 10 mounted atop a table frame 12 supported by four height adjustable legs 14. The table frame is positioned beneath a conveyor line I-beam track 16 which supports pairs of rollers 18 from which shackle brackets 19 depend. Shackles 20 are pivotally suspended from the brackets. The lower ends of the shackles have pairs of hock-gripping elements 22 from which chickens 24 are suspended by their hocks 25. For clarity, only one shackle train is shown.

A stanchion 26 mounted atop table frame 12 supports a set of bearings 28 in which shafts 30 are journalled. A chain guide 32 is mounted above the stanchion in which guide a set of four sprockets 34 are rotatably secured to shafts 30. A chain 35 is mounted in engagement about the sprockets within the bounds of chain guard 32.

A crank arm 38 is coupled with one of the sprockets 34. The crank arm itself is driven by unshown drive means which convey shackles 20 along I-beam 16. The coupling means employed serves to drive chain 35 at substantially the same linear velocity as that of the shackles themselves. In this manner positioning links 40 extending laterally from chain 35 are able to engage the lower portion of the shackles and positively urge them along the conveyor line over table frame 12 at the substantially constant velocity at which the upper portion of the shackles is being conveyed. In this manner shackles 20 maintain a substantially vertical orientation in passing over machine 10 even should the machine itself apply force to the birds suspended from the shackles.

Atop table frame 12 is also mounted a platform 42 which supports an electric motor 44 adapted to be coupled to a source of electric current through electrical conduit 45. To motor output shaft 46 is secured sprocket 48 and drive chain 50 which is coupled to a pinion 52 intermeshed with a second pinion 54. Pinion 52 drives an advancing upper roller 55 whereas pinion 54 drives an advancing lower roller 56 in opposite rotational direction to that of roller 55. The advancing rollers are knurled and with each having helical threads with those of one roller being of right-hand turn and those of the other being of left-hand turn. With this thread configuration and rotary drive directional combination the tail regions of poultry brought into engagement with the sides of the advance rollers may be drawn thereinbetween as shown by chicken 24 and advanced longitudinally therealong over a cutting blade 57 adjustably mounted above a shield 53 with the cutting edge disposed between the rollers.

In operation, a train of shackles 20 is conveyed in the direction of arrow 60 towards the opening cut machine 10 and into substantially tangential contact with a guide bar 62. As the shackles move along the guide bar they are engaged by positioning links 40 on chain 35. This positive engagement insures that the shackles will not swing laterally away from the advancing rollers nor be dragged rearwardly to insure their retention of a generally vertical orientation. The tail region of the suspended birds 24 are brought into engagement with conical section 64 at the leading end of lower advancing roller 56 and drawn inwardly between the rotating helical threads of the two rollers. The bird continues to be advanced along the rollers and cleaned by flushing fluids emitted from nozzles 65 into engagement with cutting blade 57. Throughout this advance along the rollers and over the cutting blade the shackles are prevented from pivoting to any appreciable degree by the action of rotating chain 35 and links 40 so as to entrap the tail region of the birds between the rollers. This results in the tail regions being brought cleanly over the cutting blade 57 thereby effecting an opening incision of typically one and a half inch length. The bird then is carried away from the machine to a viscerating station.

With reference next to FIGS. 5-10 the machine cutting blade is shown in an alternative form. Here blade 67 is seen to be so shaped as to have a planar upper surface 60 provided with two parallel slots 70 and a curved end 72 shown in broken lines to illustrate the fact that it if formed, typically on site, by bending at line 99 an end portion of the blade. The blade is also provided with a beveled cutting surface 74 provided with serrations 75 along the end portion of the cutting surface distal the curved blade end 72. It will be noted that the edge 73 of blade end 72 is relatively dull but becomes sharp as this edge unitarily merges with the cutting edge 74' of the beveled cutting surface 74.

The blade 67 is mounted to a blade bracket 80 by two bolts 82 which extend through blade slots 70 and are secured by two nuts 83. This mounting enables the position of the beveled cutting surface of the blade to be adjusted laterally between the upper advancing roller 55 and the lower advancing roller 56. Vertical adjustment is provided by the mounting of bracket 80 itself to the machine frame or shield 53 where similarly the lower portion of the bracket is provided with a pair of slots 86 through which bolts 87 extend.

Figure 7:
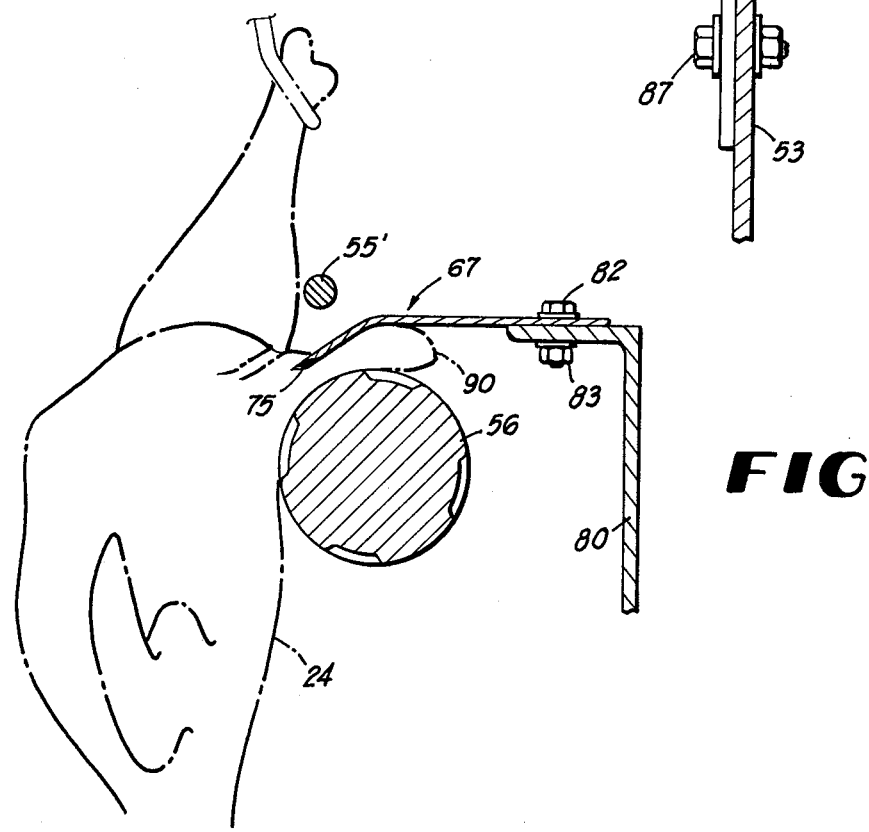
Figure 8:
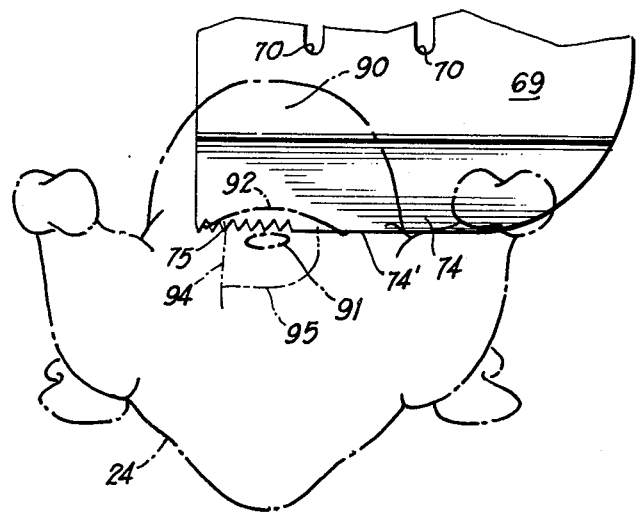
FIG. 8 is a plan view of an inverted bird having been cut with a machine embodying the invention.
Figure 9:
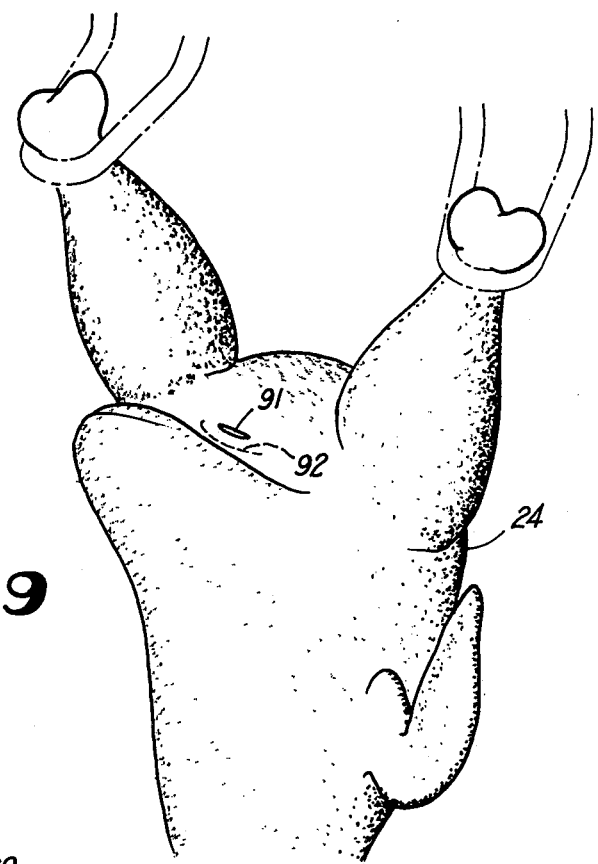
FIG. 9 is a perspective view of an inverted bird having been cut with a machine embodying the invention.
Figure 10:
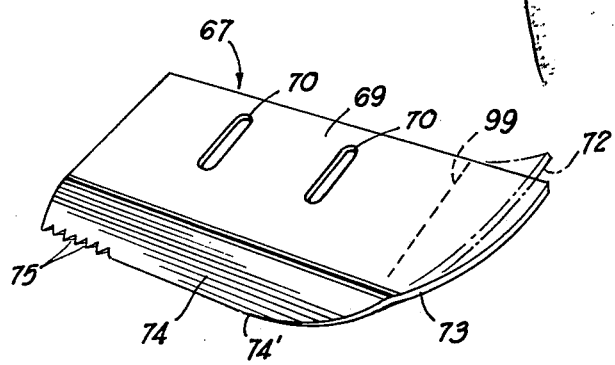
FIG. 10 is a perspective view of the blade component of the machine with the modification shown in FIG. 5.

Operation of the machine with the blade just described is substantially the same as previously described. However, here the curved blade end does serve to urge the bird tail 90 down upon contact into engagement with the upper surface of the lower advancing roller 56 as the tail region approaches the sharp cutting edge 74' without the dull edge 73 cutting or mangling the tail itself. This is sequentially shown in FIGS. 6 and 7. The blade and lower advancing roller thereafter alone act in concert to maintain the bird tail region properly positioned with tail 90 passing beneath blade 67. Thus, the upper advancing roller is seen to terminate adjacent the curved blade end with only its shaft 55' extending over the remainder of the blade. With this arrangement the relatively inaccessible skin of the bird between the bird tail 90 and anus 91 is presented to the cutting edge of the blade in making an arcuate opening cut 92 just behind the base of tail 90 as seen in FIG. 7. That the blade is beveled causes a large surface area of the tail to be maintained snugly with the advancing roller 56 as the cut is made including that cutting operation made by serrations 75 in cutting deeper seated muscle tissue. Following the machine effected opening cut two additional cuts 94 and 95 may be hand made encircling a skin and muscle plug section which may then be easily extracted.

It should be of course understood that the just described embodiments merely illustrate principles of the invention in one form. Many modifications may, of course, be made to the just described machine and process without departure from the spirit and scope of the invention as set forth in the following claims.

What is claimed is:

1. A machine for making an opening cut in poultry for evisceration comprising an overhead horizontal conveyor for depending shackles from which birds are suspended head downwardly by their hocks and with their tails facing in one direction laterally of the path of movement of the birds along said conveyor, a relatively stationary opening cut machine below said conveyor including upper and lower parallel horizontal axis counter-rotating tail gripping and advancing rollers each having a helical thread element thereon, the upper roller being smaller in diameter than the lower roller and having its rotational axis offset laterally from the axis of the lower roller so that a plane tangent to the peripheries of said rollers adjacent the tail sides of the birds is substantially vertical, the lower roller having a conically tapered upstream end portion spaced from the helical thread element of the upper roller for initial guidance of the tails of birds between said gripping and advancing rollers, the peripheries of the upper and lower rollers defined by said helical thread elements being spaced to form a tail receiving passage between said rollers, the helical thread element of the upper roller terminating upstream from the corresponding terminal of the helical thread element of the lower roller and the upper roller having a reduced diameter extension thereon downstream from the terminal of the helical thread element of the upper roller, and a stationary knife having a cutting edge extending into said tail receiving passage between the upper and lower rollers from the sides of the rollers away from advancing birds, said cutting edge extending longitudinally of the path of movement of the birds and longitudinally of the axes of said rollers, said cutting edge of said knife projecting laterally beyond the rotational axes of both rollers toward the tail sides of the birds and terminating in closely spaced relation to the tail sides and said tangent vertical plane, said knife and cutting edge arranged adjacent to said reduced diameter extension of the upper roller and having an upturned end portion at its upstream end to force the tails of birds downwardly into engagement with the helical thread element of the lower roller in the region thereof opposite to the reduced diameter extension of the upper roller, the arrangement being such that the helical thread elements of the upper and lower rollers constantly pull and stretch the tails of birds laterally into said tail receiving passage and toward the cutting edge of said knife while simultaneously advancing the tails longitudinally of the counter-rotating rollers thereby causing the knife to produce an opening cut precisely in each bird in the lower abdomen thereof between the tail and anus.

2. A machine for making an opening cut in poultry for evisceration as defined in claim 1, and an overhead moving conveyor shackle engaging and steadying means to prevent uncontrolled swinging of shackles and the birds suspended therefrom as the birds move into engagement with said gripping and advancing rollers.

3. A machine for making an opening cut in poultry for evisceration comprising an overhead horizontal conveyor for suspended birds head downwardly with their tails facing in one direction, a pair of relatively fixed counter-rotating parallel horizontal axis spirally threaded tail gripping and advancing rollers in vertically spaced relation below said conveyor, the upper roller being smaller in diameter than the lower roller and being offset laterally from the axis of the lower roller so that the peripheries of the two rollers are substantially in vertical alignment at the tail sides of suspended moving birds, the spiral thread of the upper roller terminating upstream of the spiral thread of the lower roller to form on the upper roller a downstream reduced diameter unthreaded portion opposite to the lower roller, and a stationary knife projecting into the space between the upper and lower rollers and having a cutting edge extending longitudinally of the axes of said rollers, and said knife and cutting edge positioned adjacent to said downstream reduced diameter unthreaded portion of the upper roller, whereby the tails of birds entering between said rollers are stretched laterally toward the cutting edge of said knife while being advanced simultaneously longitudinally of said rollers thereby causing the knife cutting edge to produce an opening cut in each bird between the tail and anus.

4. A machine for making an opening cut in poultry for evisceration as defined in claim 3, and an overhead moving conveyor shackle stabilizing means to prevent swinging of conveyor shackles as the birds suspended therefrom move into engagement with said gripping and advancing rollers.

5. A machine for making an opening cut in poultry for evisceration as defined in claim 3, and said knife cutting edge including a serrated downstream end portion.

* * * * *